P. M. BARKER.
MUSIC INSTRUCTION DEVICE.
APPLICATION FILED JAN. 14, 1919.
1,313,449.
Patented Aug. 19, 1919.
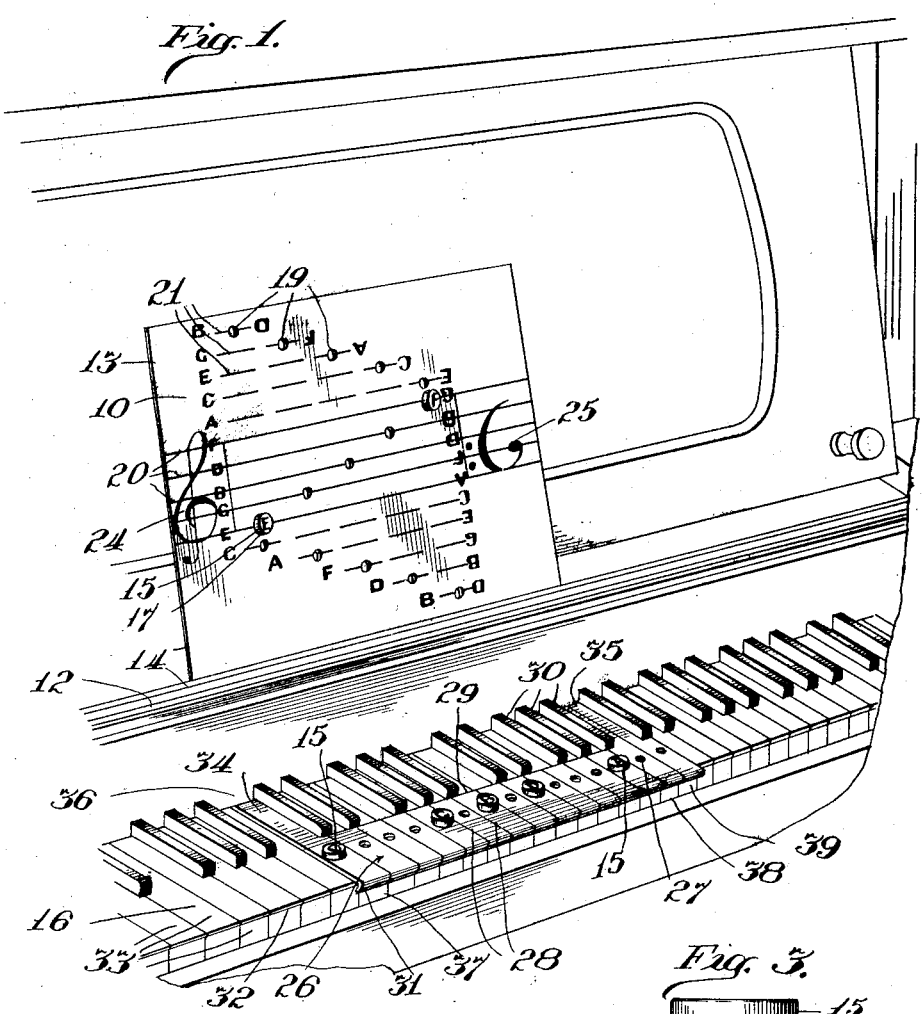
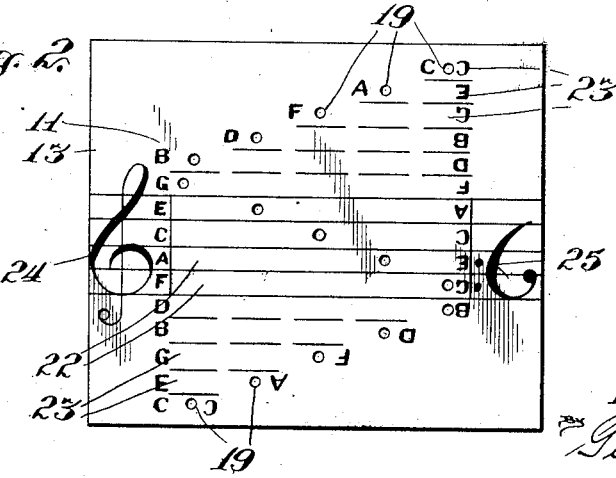
Inventor
Pearl Marie Barker
Gillson & Gillson
Attorneys

UNITED STATES PATENT OFFICE.

PEARL MARIE BARKER, OF CHICAGO, ILLINOIS.

MUSIC-INSTRUCTION DEVICE.

1,313,449.   Specification of Letters Patent.   Patented Aug. 19, 1919.

Application filed January 14, 1919. Serial No. 271,048.

*To all whom it may concern:*

Be it known that I, PEARL MARIE BARKER, a citizen of the United States, and resident of Chicago, county of Cook, and State of Illinois, have invented certain new and useful Improvements in Music-Instruction Devices, of which the following is a specification and which are illustrated in the accompanying drawings, forming a part thereof.

The invention relates to appliances for elementary instruction in music and has for its object to provide apparatus designed to enable the student to visualize the relative position of the notes upon the musical staff and upon the key board of a musical instrument. To this end the invention contemplates a chart showing the musical staff and a set of marker tablets which are transferable between corresponding positions on the chart and on the piano key board.

In the accompanying drawings;—

Figure 1 is a perspective view showing a form of apparatus provided by the invention with the parts positioned for use upon the piano, Fig. 2 is a plan view showing the reverse side of the chart illustrated in Fig. 1, Fig. 3 shows one of the marker tablets in side elevation, and Fig. 4 is an end view of a plate which rests upon the piano key board.

In its preferred form, the apparatus provided by the invention includes a pair of charts 10, 11, each showing the musical staff. To permit either one of these charts being placed before the student when seated at the piano 12, the two charts are conveniently shown upon opposite sides of a sheet 13 of stiff card board or the like, adapted to stand on the music rack 14. The apparatus also includes a set of markers 15 designed to be removably held upon either one of the charts 10, 11, or in corresponding positions upon the piano key board 16 and to be transferred from one to the other of these places by the student.

As shown, the markers 15 are seven in number and each bears a character 17, representing one of the notes of the musical scale. To provide for removably supporting the markers in designated positions upon the charts 10, 11, each of the markers is preferably made in the form of a tablet having a stem 18 and the sheet 13 is punched, as at 19, to receive the stems 18 of the several tablets 15. As it is desired that the markers 15 should be applied to one of the charts, as 10, only upon the lines 20 or added lines 21 of the staff, and to the other chart 11 only upon the spaces 22 or added spaces 23 of the staff, a simple construction is provided if the charts 10, 11, are so positioned upon the two sides of the sheet 13 that the lines 20, 21 of the chart 10 register with the spaces 22, 23, of the chart 11. Under these circumstances, the sheet 13 is punched with only one set of apertures 19. These apertures accordingly serve to locate the tablets 15 upon the lines 20 and added lines 21 of the chart 10, if the stems 18 of the markers are entered in the said apertures from one side of the sheet, whereas the same apertures 19 serve to locate the tablets 15 upon the spaces 22 and added spaces 23 of the chart 11 when the stems 18 are entered in the said apertures from the other side of the sheet. Furthermore, the same charts 10, 11, may be used for instruction regarding the position of the notes in both base and treble clef if the charts are marked at the two ends of the sheet with the corresponding clef signs, as 24, 25. Under these circumstances, each chart 10, 11, will serve to represent treble clef when placed in one position while base clef will be shown by the same chart if the sheet 13 is merely inverted.

Any convenient means may be provided for removably securing the tablets 15 in their proper positions upon the piano key board 16. When the tablets 15 are formed with the stems 18, as shown, a plate 26 having sockets 27 for receiving the said stems is preferably laid upon the key board 16. The plate 26 is preferably of sufficient length to cover two octaves and is ruled with lines 28, representing the divisions between the corresponding piano keys. Under these circumstances, the sockets 27 are formed in the spaces between the rulings 28. Each socket 27 accordingly serves to locate one of the tablets 15 over the corresponding piano key. In using the apparatus the student will first locate the tablets 15 in their proper positions upon one of the charts 10, 11, or upon the key board 16 by inserting the stem 18 of the tablets into the apertures 19 of the sheet 13 or into the sockets 28 of the plate 26. He will then transfer the tablets from the chart 10, 11, to their corresponding positions upon the key board 16 or vice versa.

While it is desirable that the plate 26 may be easily applied to or removed from the piano key board 16, provision is preferably made for preventing accidental displacement of the plate 26 during the application and removal of the tablets 15. As shown, the intermediate portion, as 29, of the plate 26, is of such width that it may rest with its inner edge engaged with the outer ends of the black keys 30 of the key board 16 while the outer edge of the plate 26 is formed with a rolled rim 31 designed to extend about the projecting flange 32 usually provided at the outer ends of the white keys 33 of a piano key board. The plate 26 may also be formed with rearwardly projecting fingers 34, 35, adjacent its opposite ends. As shown, the fingers 34, 35, are located at such distance from each other to embrace the black keys 30 of the two octaves between them. They are also of such length that their end portions may be extended beneath the fall board 36 of the piano by depressing the corresponding white keys, as 37, and 38, 39. Inward displacement of the plate 26 is accordingly prevented by the engagement of the inner edge of the intermediate portion of the plate with the outer ends of the black keys 30 an lateral displacement of the plate is prevented by engagement of the fingers 34, 35, with the sides of the adjacent black keys. Furthermore, the tendency to upward displacement of the plate 26 upon withdrawal of the stems 18 of the tablets 15 from the sockets 27 is resisted both by the engagement of the rolled rim 31 at the outer edge of the plate with the flanges 32 at the outer ends of the white keys 33 and by the engagement of the inner ends of the fingers 34, 35, with the fall board 36.

I claim as my invention:

1. In a device of the kind described, in combination, an apertured board ruled upon each side to show the musical staff and the apertures of the board being arranged in a single set registering with the lines of the staff shown upon one side of the board and with the spaces of the staff shown upon the other side of the board, and a set of marker pegs constructed to enter the apertures of the board from either side of the same.

2. In a device of the kind described, an apertured board ruled upon each side to show the musical staff and the apertures of the board being arranged in a single set registering with the lines of the staff shown upon one side of the board and with the spaces of the staff shown upon the other side of the board, an upright treble clef marking at one end of the staff at each side of the board, an inverted base clef marking at the other end of the staff at each side of the board and a set of marker pegs constructed to enter the apertures from either side of the same.

3. The combination with the key board of a musical instrument, of a socketed board ruled to show the musical staff with intervals of the staff registering with the sockets of the board, a socketed plate constructed to rest upon the key board of the musical instrument with the sockets of the plate registering with the keys of the said key board, and a set of marker plugs interchangeably insertible in corresponding sockets of the board and plate.

PEARL MARIE BARKER.